United States Patent [19]

Waterman et al.

[11] Patent Number: 5,576,520
[45] Date of Patent: Nov. 19, 1996

[54] CHECKWEIGHER HAVING VARIABLE WEIGH PLATFORM

[75] Inventors: David Waterman, Dryden; John Lindstrom, Newfield, both of N.Y.

[73] Assignee: Hi-Speed Checkweigher Co., Inc., Ithaca, N.Y.

[21] Appl. No.: 279,953

[22] Filed: Jul. 25, 1994

Related U.S. Application Data

[63] Continuation of Ser. No. 52,559, Apr. 23, 1993, abandoned.

[51] Int. Cl.[6] ............... G01G 19/00; G01G 21/22; B65G 15/10
[52] U.S. Cl. ............... 177/145; 198/817; 177/262
[58] Field of Search ............... 198/836.3, 817; 177/52, 145, 262

[56] References Cited

U.S. PATENT DOCUMENTS

| | | | |
|---|---|---|---|
| 1,476,112 | 12/1923 | Small | 198/836.3 |
| 2,229,605 | 1/1941 | Snyder et al. | 198/836.3 |
| 3,180,475 | 4/1965 | Rosso | 177/145 |
| 4,538,694 | 9/1985 | Hudson | 177/145 |
| 5,434,366 | 7/1995 | Troisi | 177/52 |

OTHER PUBLICATIONS

Documentation re Machine Job No. 1287366 (Checkweigher) includes: 2 Photographs of checkweigher taken just prior to shipping; Copy of a "Mechanical Changes and Additions" form; Copy of a form containing control parameters; Copies of 2 accuracy check–out sheets.
Documentation re Machine Job No. 92120513 (Checkweigher) includes: Customer Service Manual, pp. 1–9 and 1–10; Copy of notes supplied to assembler by designer.

Primary Examiner—Brian W. Brown
Assistant Examiner—Randy W. Gibson
Attorney, Agent, or Firm—Bean, Kauffman & Spencer

[57] ABSTRACT

A method and apparatus is disclosed for use in weighing products having circular or oval footprint configurations. A conveyor having a pair of parallel conveyor elements arranged to underengage the footprint only adjacent the periphery thereof transports the products one at a time across a planar surface of a weigh pan or scale device. The surface of the weigh pan is shaped and the transverse spacing between the conveyor elements is adjustable in order to permit lengths of the surface of the weigh pan engaged by the conveyor elements to be selected to correspond essentially to dimensions of differently sized products to be weighed.

23 Claims, 3 Drawing Sheets

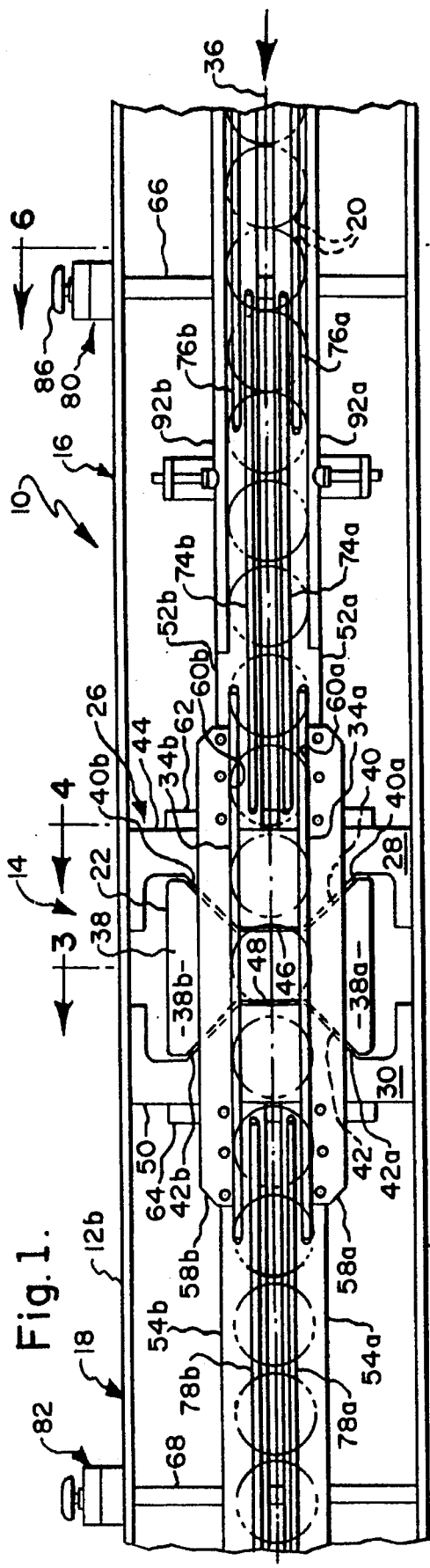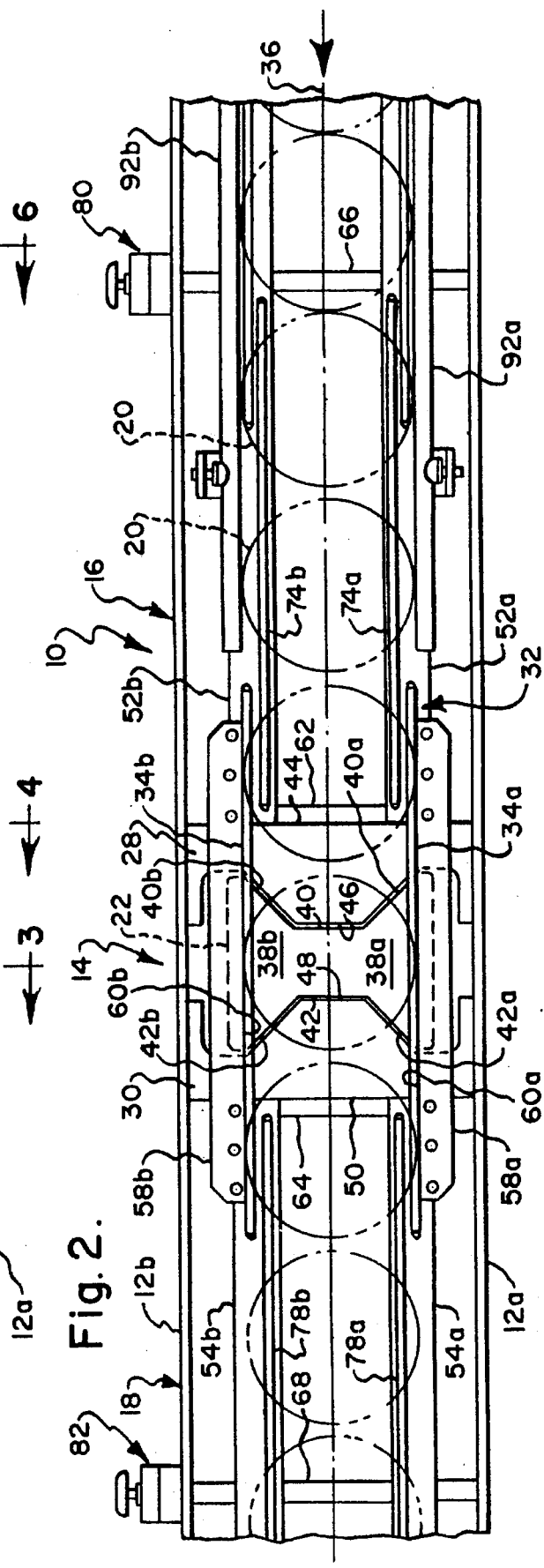

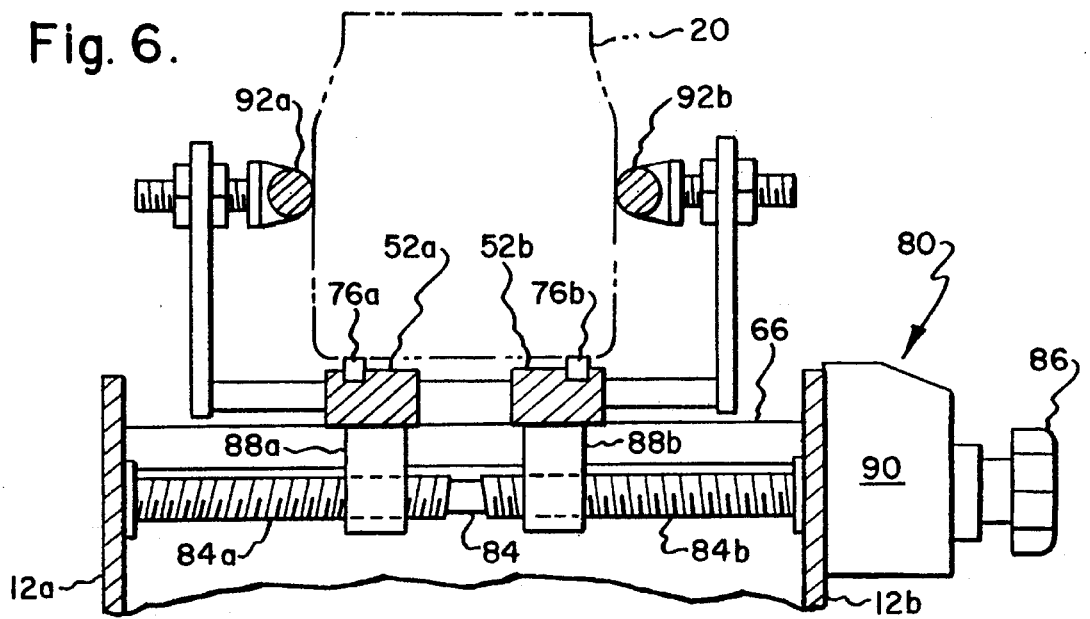
Fig. 6.
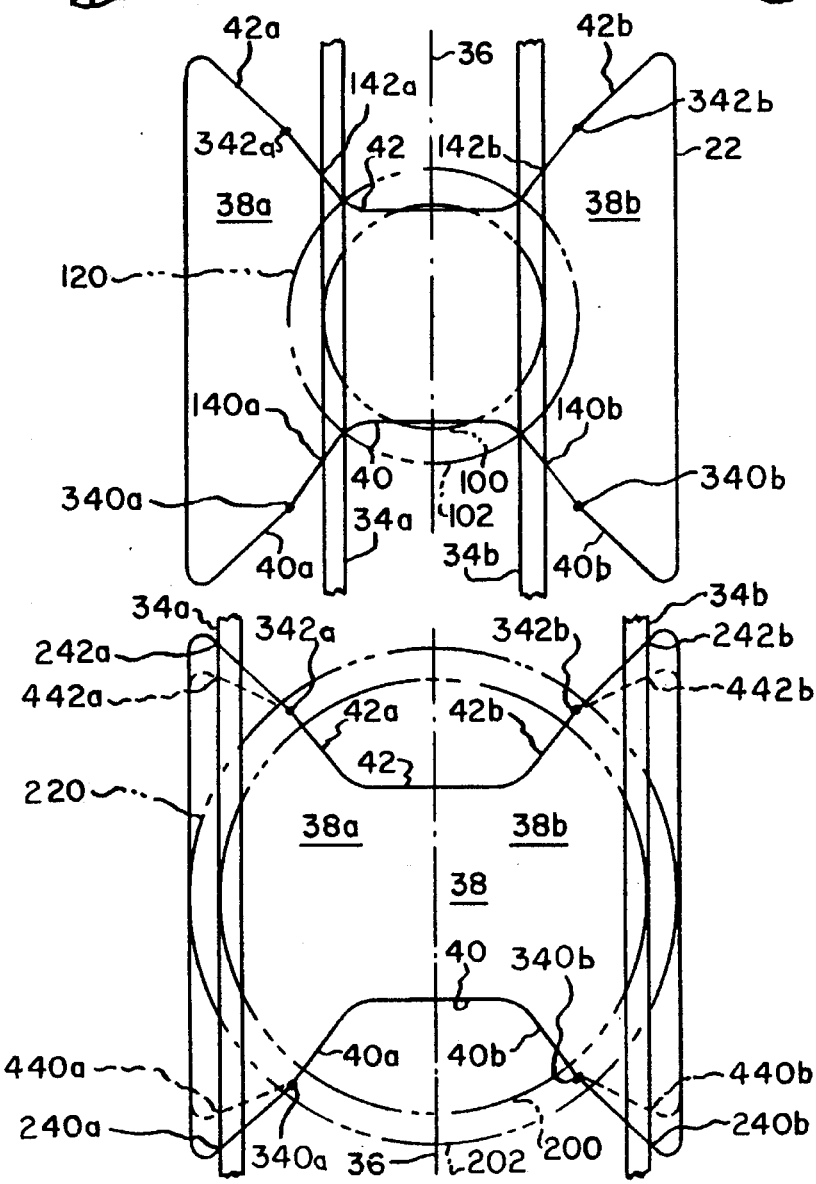
Fig. 7a.
Fig. 7b.

CHECKWEIGHER HAVING VARIABLE WEIGH PLATFORM

This is a continuation of application Ser. No. 08/052,559 filed on Apr. 23, 1993, now abandoned.

BACKGROUND OF THE INVENTION

The invention generally relates to high speed weighing equipment of the type employing a conveyor to transport containers one at a time across a vertically deflectable weigh pan or scale device operable to effect weighing of the products. More particularly, the invention relates to improvements in weighing equipment of the type intended for use in the weighing of containers having either circular or oval footprint configurations and employing conveyors characterized as having a pair of parallel conveying elements, such as endless chains, arranged to underengage the footprints of the containers as they transport the containers for movement across a weigh pan.

In commonly assigned U.S. patent application Ser. No. 07/942,647, filed Sep. 9, 1992, there is disclosed a method and apparatus for weighing products of either circular or oval footprint configuration, wherein the products are supported by conveyor chains arranged to underengage the footprints only immediately adjacent the periphery thereof in order to minimize the effective length of products, as seen by the weigh pan. In a preferred embodiment, the length of the weigh pan in the direction of product movement is chosen to correspond essentially to a dimension of the product to be weighed, as measured in the direction of conveyor movement.

Once a given checkweigher has been fitted with a weigh pan of a given length to effect weighing of product of a given dimension, the checkweigher may not thereafter be used efficiently in the weighing of products having substantially different dimensions, without first affecting a substantial reconstruction of the checkweigher, including the mounting of a new appropriately sized weigh pan.

SUMMARY OF THE INVENTION

The present invention relates to checkweighers, and more particularly to improvements in checkweighers of the type disclosed in commonly assigned U.S. patent application Ser. No. 07/942,647, filed Sep. 9, 1992, whose disclosure is incorporated herein by reference.

In accordance with the present invention, a checkweigher incorporating the invention of the above patent application is modified to permit it to selectively weigh products chosen from a series of groups of differently sized products.

More specifically, the present invention generally contemplates forming a weigh pan whose effective length for product weighing purposes varies in a direction extending transversely of the direction in which product is transported across the weigh pan by a pair of conveyor elements and providing means to adjustably vary the transverse spacing between the conveyor elements and position such elements above effective lengths of the weigh pan corresponding generally to predetermined dimensions of each group of the series of products to be weighed.

In a preferred construction, the weighing surface of the weigh pan is planar and has a "bow tie" top plan view configuration, wherein like configured surface portions are arranged on opposite sides of a reference line disposed in alignment with the direction of conveyor travel. The surface portions are bounded by pairs of upstream and downstream facing marginal edge portions, which diverge relative to the reference line in upstream and downstream directions such that the effective lengths of the surface portions, as measured between the upstream and downstream marginal edge portions, are equal at all points spaced equidistances from the reference line, and increase in size transversely outwardly of the reference line. Vertically stationary infeed and discharge transfer or guide surfaces are disposed upstream and downstream relative to the weighing surface of the weigh pan, and pairs of infeed and discharge conveyor element supporting runners are arranged to support the conveyor elements for travel in surface engagement successively across the infeed transfer surface, the weighing surface and the outfeed transfer surface. A pair of chain guides are opposite end connected to the infeed and discharge runners in bridging relation to the infeed transfer, weighing and outfeed transfer surfaces and serve to constrain the conveyor elements against transversely directed separating movements in passing between the infeed and discharge runners. The infeed and discharge runners, together with the chain guides, are supported for adjustment in order to selectively position the conveyor elements for overlying engagement with like effective lengths of the surface portions determined by the dimensions of products to be weighed.

BRIEF DESCRIPTION OF THE DRAWINGS

The nature and mode of operation of the present invention will now be more fully described in the following detailed description taken with the accompanying drawings wherein:

FIG. 1 is a top plan view of a checkweigher incorporating the preset invention;

FIG. 2 is an enlarged top plan view showing the checkweigher adjusted to accommodate for the weighing of product of larger dimension;

FIG. 6 is a sectional view taken generally along the line 6—6 in FIG. 1; and

FIGS. 7a and 7b are enlarged top plan views of the weigh pan of the checkweigher showing differently sized products positioned thereon.

DETAILED DESCRIPTION

Figure 3:
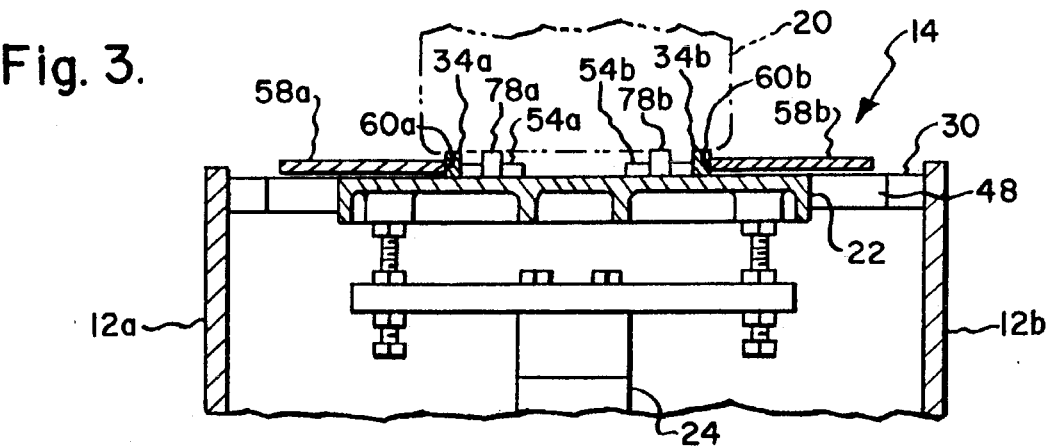
FIG. 3 is a sectional view taken generally along the line 3—3 in FIG. 1.
Figure 4:
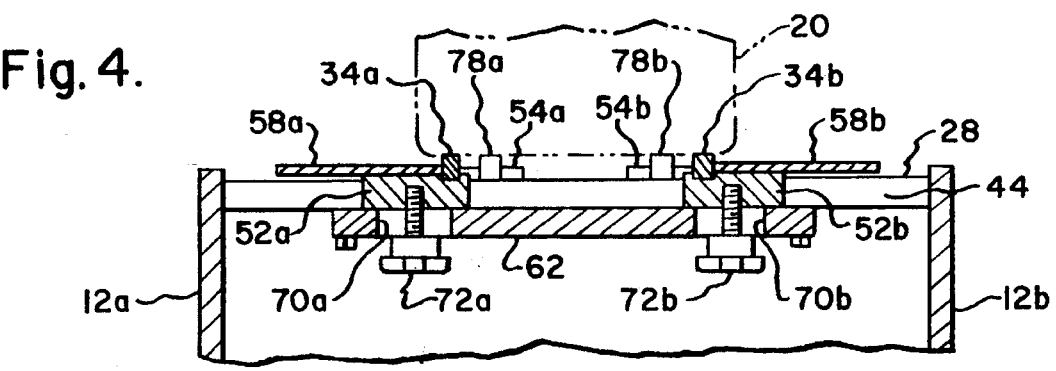
FIG. 4 is a sectional view taken generally along the line 4—4 in FIG. 1.

Reference is first made to FIGS. 1 and 2 wherein a checkweigher is designated as 10 and shown as generally including a frame including a pair of parallel side plates 12a and 12b; a product weighing station 14; a infeed section 16 for supplying product to the weighing station; and a product discharge section 18 for discharging weighed products from the weighing station. Products to be weighed may include containers 20 having either circular or oval footprint configurations, but to facilitate description of the present invention only containers having circular footprints are illustrated in the drawings.

Weighing station 14 is shown in FIGS. 1–3 as generally including a horizontally disposed weigh pan 22, which is operably connected to a load cell 24 and vertically deflectable to provide a signal indicative of the weight of products to be weighed; a transfer means 26 defining vertically stationary and coplanar infeed or supply and discharge or outfeed guide surfaces 28 and 30 arranged to extend horizontally between side plates 12a, 12b; and a product conveyor 32 including a pair of parallel conveyor elements 34a and 34b arranged on opposite sides of and equidistant from a reference line 36, which extends lengthwise of checkweigher 10 in alignment with the direction of conveyor movement and in a bisecting relationship relative to weigh pan 22 and guide surfaces 28 and 30.

In accordance with a preferred form of the invention, weigh pan 22 is provided with a planar weighing surface 38, which has a "bow tie" top plan view configuration, wherein a pair of like configured surface portions 38a and 38b are disposed on opposite sides of reference line 36. Surface portions 38a and 38b are partially bounded by upstream or first and downstream or second marginal edge portions 40 and 42, respectively, wherein one and preferably both of such marginal edge portions are defined in part by pairs of edges 40a, 40b and 42a, 42b, which diverge relation to reference line 36 and in directions facing upstream and downstream of the weigh pan, as best shown in FIGS. 1, 2, 7a and 7b. Edges 40a, 40b and 42a, 42b are shaped and arranged such that surface portions 38a and 38b have like dimensions or surface lengths, as measured in the direction of conveyor movement and along lines disposed parallel to and equidistant from reference line 36, wherein such dimensions or surface lengths increase in size outwardly relative to such reference line.

Infeed and discharge guide surfaces 28 and 30 are shown in FIGS. 1 and 2 as being bounded in part by upstream and downstream marginal edge portions 44, 46 and 48, 50, wherein downstream and upstream edge portions 46 and 48 are disposed closely adjacent and shaped to generally conform to the configurations of marginal edge portions 40 and 42 respectively, and upstream and downstream edge portions 44 and 50 are essentially parallel and extend transversely of reference line 36. Guide surfaces 28 and 30 are disposed to lie essentially coplanar with weighing surface 38 when the latter is in an unloaded or non-deflected condition.

Figure 5:
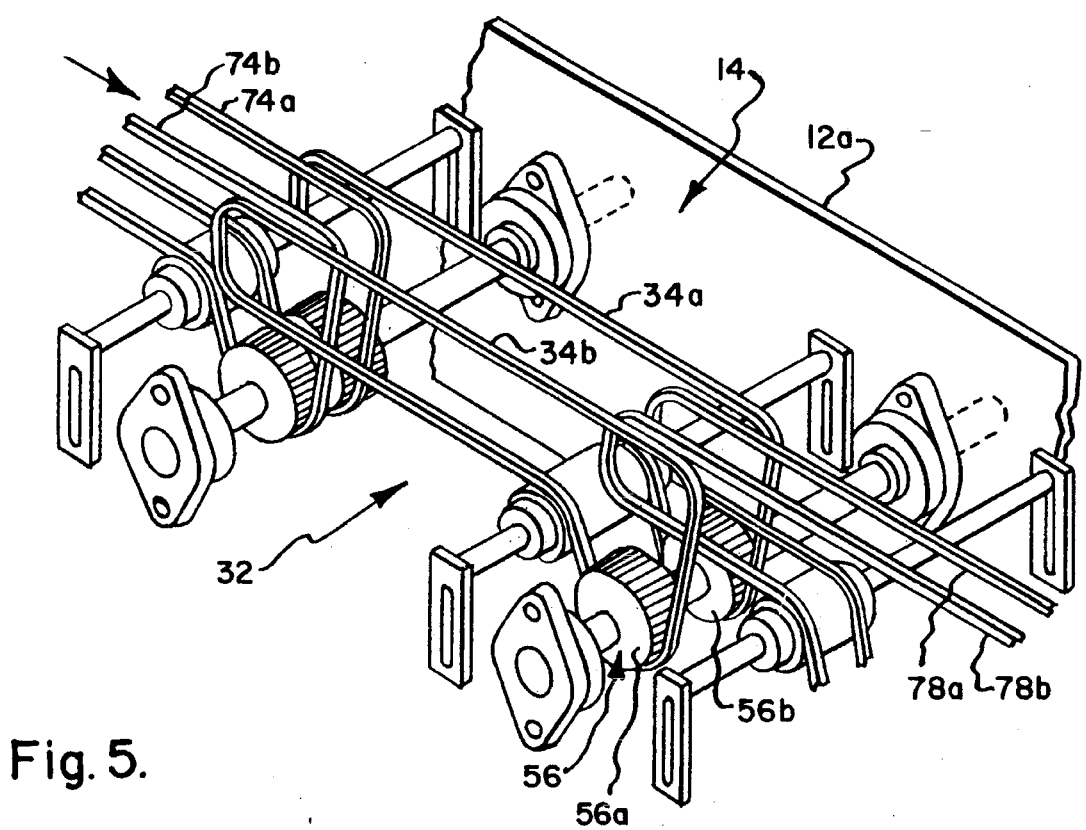
FIG. 5 is a fragmentary prospective view of the conveyor drive.

Conveyor elements 34a and 34b are preferably in the form of a pair of endless chains, which are trained by pairs of parallel infeed and discharge conveyor element supporting runners 52a, 52b and 54a, 54b, respectively, to pass successively across and in engagement with infeed guide surface 28, weighing surface 38 and discharge guide surface 30, and to pass over a powered drive including for example a drive sprocket 56 shown only in FIG. 5. Sprocket 56 is arranged below surfaces 28, 30 and 38; supported for rotation about an axis extending horizontally and transversely of reference line 36; and provided with a axially extending drive teeth or splines 56a, 56b in order to allow the conveyor elements to be displaced lengthwise of such axis incident to adjustment of the transverse spacing between the conveyor elements, as required to accommodate for the weighing of differently sized products.

Runners 52a and 52b are rigidly interconnected with runners 54a and 54b, respectively, by a pair of parallel guide plates 58a and 58b, which bridge across surfaces 28, 38 and 30, as best shown in FIGS. 1–4, and have facing edges 60a and 60b arranged to be slidably engaged by oppositely facing edges of conveyor elements 34a and 34b in order to prevent transversely directed separating movement of the conveyor elements in passing between the infeed and discharge supporting runners. The infeed and discharge supporting runners are slidably supported and releasbly clamped to a pair of clamp plates 62 and 64, which are inturn fixed to upstream and downstream ends of transfer means 26, and upstream and downstream runner support tie bars 66 and 68, which bridge between and have their opposite ends fixed to side plates 12a and 12b. As shown only for the case of clamp plate 62 in FIG. 4, one suitable means for releasably clamping the supporting runners includes a pair of aligned guide slots 70a and 70b formed in the clamp plate and a pair of manually operably, screw type clamping devices 72a and 72b, which extend through the guide slots for threaded receipt within runners 52a and 52b and clamping engagement with the lower surface of the clamp plate.

Runners 52a and 52b extend through inlet section 16 and serve to mount pairs of infeed conveyor elements 74a, 74b and 76a, 76b; and runners 54a and 54b extend through discharge section 18 and serve to mount a pair of discharge conveyor elements 78a, 78b. The infeed and discharge conveyor elements may be driven by a common source of power, not shown, via individual drive sprockets identical to drive sprocket 56.

Upon the unclamping of runners 52a, 52b, 54a and 54b relative to clamp plates 62 and 64 and tie bars 66 and 68, the transverse spacing between runners 52a and 54a and runners 52b and 54b may be adjusted for purposes of adjusting the transverse spacing between conveyor elements 34a and 34b, 74a and 74b, 76a and 76b, and 78a and 78b to accommodate for the weighing of differently sized products. In accordance with a preferred form of the invention, an adjustment means is provided to uniformly adjust the transverse spacing between the pairs of conveyor elements, such that the conveyor elements of each pair are spaced equidistant from reference line 36. One suitable adjustment means includes like constructed upstream and downstream adjusting mechanisms 80 and 82, shown in FIG. 6 for the case of mechanism 80, as comprising an adjustment screw 84, which is journalled by side plates 12a and 12b for rotation in opposite directions under the control of a manual adjustment knob 86 and is formed with oppositely threaded end portions 84a and 84b; and a pair of adjustment blocks 88a and 88b, which are threadably coupled to end portions 84a and 84b, and rigidly fixed to lower surfaces of runners 52a and 52b. Thus, upon rotation of adjustment screw 84, runners 52a and 52b are forced to move either towards or away from reference line 36 through like distances. The transverse spacing between the conveyor elements supported by the runners is correlated with the direction and number of rotations of adjustment screw 84 relative to some reference position, and an indication of such spacing may be provided by a digital readout device 90 associated with the adjustment screw. If desired, means, not shown, may be provided to effect simultaneous adjustments of mechanisms 80 and 82. After an adjustment is completed, the runners would be clamped in position prior to initiating a subsequent weighing operation.

By again referring to FIG. 6, it will be understood that product side guide rails 92a and 92b, which are typically associated with the infeed section of a checkweigher, are in accordance with the present construction preferably supported by and for movement with runners 52a and 52b in order to effect spacing of the side guide rails in accordance with the size of products to be weighed.

Surface portions 38a and 38b are considered as defining an infinite number of pairs of parallel surface lengths, wherein the surface lengths of each pair are of equal length, are aligned with the direction of movement of conveyor elements 34a and 34b, extend between marginal edge portions 40 and 42, and lie on opposite sides of and at equidistances from reference line 36. The number of pairs of surface lengths required to be defined by weigh pan 22 of a given checkweigher would be determined by the number of groups of products defining a series of groups intended to be weighed, whereas the size or length of each pair of surface lengths would be determined by a given dimension of products of one of such groups of such series.

As by way of example, reference is made to FIGS. 7a and 7b, wherein one product of a first group of like products is designated as 120; and one product of a second group of like products is designated as 220, wherein products 120 and 220 are in the shape of typical food containing jars and have differently sized circular footprint configurations 100 and 200, and, differently sized and relatively enlarged main or maximize size body portions 102 and 202 of circular cross sectional configuration.

When checkweigher 10 is intended to weigh a series of groups consisting only of the groups of products 120 and 220, only two pairs of surface lengths are required, and the size and geometry of surface portions 38a and 38b can be determined in the following manner. First, in accordance with the practice of the invention described in commonly assigned U.S. patent application Ser. No. 07/942,647, filed Sep. 9, 1992, conveyor 32 must be capable of being adjusted to alternatively position conveyor elements 34a and 34b for underengagement with footprints 100 or 200 relatively adjacent the periphery thereof as indicated in FIGS. 7a and 7b. First points 140a, 140b, 142a and 142b of edges 40a, 40b, 42a and 42b are then determined by the intersections of a first pair of parallel lines drawn normal to reference line 36 and tangent to body portion 102 adjacent the upstream and downstream facing surfaces thereof with the oppositely facing or outer edges of conveyor elements 34a and 34b, while underengaged with footprint 100, as shown in FIG. 7a. Second points 240a, 240b, 242a and 242b of edges 40a, 40b, 42a and 42b are then determined by the intersection of a second pair of parallel lines drawn normal to reference line 36 and tangent to body portion 202 adjacent the upstream and downstream facing surfaces thereof with the oppositely facing edges of conveyor elements 34a and 34b, while underengaged with footprint 200 adjacent the periphery thereof, as shown in FIG. 7b. Where only two groups of products are to be weighed, edges 40a, 40b, 42a and 42b may be defined by simply drawing straight edge lines between points 140a and 140a, 140b and 240b, 142a and 242a, and 142b and 242b. When the series of groups of products to be weighed is desired to include a third group of products, not shown, which are sized intermediate products 120 and 220 a third group of points designated for example as 340a, 340b, 342a and 342b in FIGS. 7a and 7b, is determined following the procedure described above. Dependant on the relative sizing of the footprint and body portion of the products of the third group of products, points 340a, 340b, 342a and 342b may fall on or closely adjacent the previously described straight edge lines, or, as shown in FIGS. 7a and 7b, be spaced sufficiently from such edge lines, such as to require edges 40a, 40b, 42a and 42b to be constructed from a pair of edge lines, such as for example in the case of edge 40a, an edge line drawn from point 140a to point 340a and an edge line drawn from point 340a to point 240a. Thus, the specific shape or contour of edges 40a, 40b, 42a and 42b may be straight or defined by drawing edge lines between a number of points dependant upon the number of groups of products to be weighed and the relative sizing of the footprint and body portion of the products of the groups, if in excess of two groups. In any case, each group of products to be weighed would require surface portions 38a and 38b to provide a corresponding pair of parallel, equal size surface lengths, which underlie and support conveyor elements 34a and 34b, and extend between edge portions 40 and 42 with the opposite or outer edges of such surface lengths passing through points whose positions are approximately determined in the manner described above. Thus, as by way of example, a first pair of surface lengths would underlie conveyor elements 34a and 34b when the latter underlie the periphery of footprint 100 as shown in FIG. 7a and extend between edge portions 40 and 42 with their opposite edges passing through points 140a and 142a and through points 140b and 142b.

The length of each pair of surface lengths provided by weighing surface 38 is preferably essentially equal to a dimension of an associated product to be weighed, as measured in alignment with the direction of travel of conveyor. Thus, for products of the type shown in FIGS. 7a and 7b, the lengths of the pairs of surface lengths correspond essentially to the maximum diameters of products 120 and 220.

It will be understood that the lengths of the pairs of surface lengths may be greater or less that the maximum dimension of a product to be weighed. However, surface lengths exceeding the product dimension are not desirable, since more than one product could be presented to the weigh pan, during a weighing cycle, and this would require accurate control of the time weight readings are obtained in order to insure that the sensed weight does not include weight attributable to the presence of an adjacently conveyed product. On the other hand, surface lengths less than the product dimension are not desirable, since reduction in length results in a loss of time available to take weight readings. It is anticipated, however, that for many checkweigher installations, the differences in relative sizing of the footprint and body portion of products of the groups of products to be weighed will be such as to allow weigh pan surface 38 to be formed with straight upstream and downstream edge portions without introducing substantial errors into the weighing operation.

As by way of further example, if the diameter of main body portions of product 220 were to be reduced to correspond essentially to the diameter of footprint 200 as would be the case if product 220 were a beverage containing can, the dimension of product 220 in the direction of conveyor movement would be reduced to that of the diameter of footprint 200, and this would permit a reduction in the length of the pair of surface lengths used to effect weighing of product 220 to lengths measured between points 440a and 442a and between points 440b and 442b shown only in FIG. 7b. These new points would be determined by the intersections of a pair of parallel lines drawn normal to reference line 36 and tangent to the upstream and downstream edges of footprint 200 and the outer or oppositely facing edges of conveyor elements 34a and 34b, when underengaged with such footprint. As a result, the shape of edges 40a, 40b, 42a and 42b could be altered in the manner shown in broken line in FIG. 7b.

Containers having a generally oval footprint configuration may also be weighed in accordance with the present invention, but care must be taken to ensure that either the major or minor axis of the footprint, and preferably the minor axis, is maintained in alignment with the direction of conveyor travel.

As will be apparent, it is preferable to form weighing surface 38 as a planar surface, since it allows a substantial number of differently sized products to be weighed by the expedient of simply slidably adjusting the transverse distance between conveyor elements.

What is claimed is:

1. In a checkweigher having a weigh pan vertically deflectable to provide a signal indicative of the weight of products to be weighed and a product conveyor having a pair of parallel, product footprint supporting conveyor elements arranged to move across and in engagement with a surface of said weigh pan for transporting said products one at a time across said weigh pan to effect weighing thereof, an improvement for permitting the weighing of a series of groups of said products, wherein said products of each group have a given dimension, as measured in the direction of movement of said conveyor, and said given dimension of products of one group varies from said given dimension of products of other groups of said series of groups, said improvement comprising in combination:

said surface of said weigh pan is essentially planar and defines pairs of parallel surface lengths disposed in alignment with said direction of movement, said pairs of surface lengths corresponding in number to the number of said groups of said series and each of said pairs of surface lengths having a length corresponding essentially to said given dimension of products of one said groups; and adjustment means are provided to adjustably move said conveyor elements transversely of said direction of movement to overlie one of said pairs of surface lengths whose length corresponds essentially to said given dimension of products of a group of products to be weighed.

2. The improvement according to claim 1, wherein said surface of said weigh pan is bounded in part by first and second marginal edges arranged upstream and downstream relative to said direction of movement, respectively, said pairs of surface lengths extend between said first and second marginal edges and at least one of said marginal edges includes a pair of divergent edge portions, wherein the lengths of said pairs of surface lengths increase outwardly relative to a reference line extending along said surface of said weigh pan in alignment with said direction of movement.

3. The improvement according to claim 2, wherein each of said first and second marginal edges includes a pair of divergent edge portions, and the pairs of divergent edge portions diverge in opposite directions.

4. The improvement according to claim 1, wherein a reference line arranged in alignment with said direction of movement bisects said surface of said weigh pan, said surface is bounded in part by first and second pairs of marginal edge portions diverging relative to said reference line upstream and downstream of said direction of movement, respectively, and said pairs of surface lengths extend between said first and second pairs of marginal edge portions.

5. The improvement according to claim 4, wherein a pair of infeed conveyor elements and a pair of outfeed conveyor elements are arranged in alignment with said direction of movement, and the transverse spacing between all of said pairs of conveyor elements is simultaneously adjusted.

6. The improvement according to claim 2, wherein said surface lengths of said pairs of surface lengths have widths corresponding essentially to the widths of said conveyor elements, and relatively outer edges of said surface lengths of each pair intersect with said first and second marginal edges at points spaced apart through a distance corresponding essentially to one of said given dimensions.

7. The improvement according to claim 6, wherein each of said first and second marginal edges are defined by essentially straight lines drawn between said points thereof.

8. The improvement according to claim 1, wherein said conveyor elements are endless and pass over first and second vertically stationary surfaces arranged to extend upstream and downstream relative to said surface of said weigh pan in said direction of movement and over a conveyor element drive located relatively below said stationary surfaces and said surface of said weigh pan, said drive being supported for rotation about an axis extending transversely of said direction of movement, and said conveyor elements are supported by said drive for movement lengthwise of said axis incident to movement of said conveyor elements by said adjustment means to overlie one of said pairs of surface lengths.

9. In a checkweigher having a weigh pan vertically deflectable to provide a signal indicative of the weight of products to be weighed and a product conveyor having a pair of parallel, product footprint supporting conveyor elements arranged to move across and in engagement with a surface of said weigh pan for transporting said products one at a time across said weigh pan to effect weighing thereof, an improvement comprising in combination:

said surface of said weigh pan including a pair of like configured surface portions arranged on opposite sides of a reference line extending in alignment with said direction of movement, said surface portions having lengths as measured along lines arranged parallel and equidistant relative to said reference line which are essentially equal to one another and which increase in size in directions transversely outwardly of said reference line, said conveyor elements are arranged on opposite sides of and at equidistant spacings from said reference line to overlie said surface portions; and adjustment means for adjustably varying the equidistant spacings of said conveyor elements relative to said reference line.

10. The improvement according to claim 9, wherein said checkweigher further includes infeed and outfeed conveyors for supplying products to and transporting products from said product conveyor, said infeed and outfeed conveyors each having a pair of parallel conveyor elements arranged on opposite sides of and at equidistant spacings from said reference line, and said adjustment means conjunctively varies the equidistant spacings of all of said pairs of conveyor elements.

11. The improvement according to claim 9, wherein said surface portions are bounded in part by first and second marginal edges facing upstream and downstream relative to said direction of movement, respectively, and said first and second marginal edges diverge relative to said reference line.

12. In a checkweigher having a weigh pan vertically deflectable to provide a signal indicative of the weight of products to be weighed and a product conveyor having a pair of parallel, product footprint supporting conveyor elements arranged to move across and in engagement with a weighing surface of said weigh pan for transporting said products one at a time across said weigh pan to effect weighing thereof, an improvement comprising in combination:

transfer means defining vertically stationary infeed and outfeed guide surfaces arranged to underengage said conveyor elements immediately adjacent said weighing surface of said weigh pan in alignment with the direction of movement of said conveyor elements across said weighing surface;

said weighing surface including a pair of like surface portions arranged on opposite sides of a reference line extending in alignment with said direction of movement, said surface portions having like dimensions as measured along lines disposed parallel to and equidistant from said reference line which increase in size outwardly relative to said reference line; and adjustment means for arranging said conveyor elements on opposite sides of and at equidistances from said reference line and for adjusting the equidistant spacing of said conveyor elements from said reference line.

13. The improvement according to claim 12, wherein a pair of parallel facing guides overlie said weighing surface and are arranged to be slidably engaged by said conveyor elements, and said guides are adjustable to vary the spacing of said guides from said reference line.

14. The improvement according to claim 12, wherein said surface portions are bounded by a pair of upstream and a pair of downstream edge portions spaced apart in said direction of movement, said pair of upstream edge portions diverging relative to said reference line in an upstream direction and said pair of downstream edge portions diverging relative to said reference line in a downstream direction, and said infeed and outfeed guide surfaces are each bounded in part by a pair of edge portions disposed adjacent and generally conforming in configuration to said pairs of upstream and downstream edge portions, respectively.

15. The improvement according to claim 14, wherein a pair of parallel facing guides upstand above said surface portions and are disposed for slidable engagement one by each of said conveyor elements, and said guides are mounted for adjustment with said conveyor elements relative to said reference line.

16. The improvement according to claim 12, wherein pairs of infeed and discharge conveyor element supporting runners are arranged to support said conveyor elements for travel successively across said infeed guide surface, said weighing surface and said outfeed guide surface, a pair of parallel facing guides having opposite ends thereof fixed to said infeed and discharge conveyor element supporting runners constrain transverse separating movement of said conveyor elements passing therebetween, and said adjustment means adjustably moves said runners and said guides relative to said reference line.

17. The improvement according to claim 16, wherein said surface portions are bounded by a pair of upstream and a pair of downstream edge portions spaced apart in said direction of movement, said pair of upstream edge portions diverging relative to said reference line in an upstream direction and said pair of downstream edge portions diverging relative to said reference line in a downstream direction, and said infeed and outfeed guide surfaces are each bounded in part by a pair of edge portions disposed adjacent and generally conforming in configuration to said pairs of upstream and downstream edge portions, respectively.

18. The improvement according to claim 16, wherein said adjustment means includes means for slidably supporting said supporting runners for movement transversely of said reference line and releasably retaining said supporting runners against sliding movement, and screw means for effecting said sliding movement, said screw means including oppositely threaded screw threaded portions threadably coupled one supporting runner of each pair of said supporting runners.

19. A method of weighing a series of groups of products, wherein the products of each said group are characterized as having a footprint of either a circular or an oval configuration and as having a given dimension, said given dimension of the products of one group varying from the given dimension of the products of other groups of said series of groups, comprising:

providing product weighing means including a weigh pan vertically deflectable to provide a signal indicative of the weight of said products to be weighed;

providing a pair of conveyor elements for underengaging the footprints of said products of each of said groups adjacent the peripheries thereof and for movement across and in engagement with a surface of said weigh pan for effecting weighing of said products of each of said groups one at a time;

providing said surface of said weigh pan with a series of pairs of parallel surface lengths disposed in alignment with the direction of said movement, said pairs of surface lengths corresponding in number to said groups of said series and the length of each of said pairs of surface lengths corresponding essentially to said given dimension of products of one of said groups;

providing mechanical adjustment means to adjustably move said conveyor elements transversely of said direction of said movement, and arranging said conveyor elements to overlie one of said pairs of surface lengths corresponding essentially in length to said given dimension of said products of one of said groups of said series to be weighed by said adjustment means.

20. A method according to claim 19, wherein said surface of said weigh pan is planar and bounded in part by first and second marginal edges facing upstream and downstream relative to said direction of said movement, respectively, said pairs of surface lengths extending between said first and second marginal edges and at least one of said marginal edges includes a pair of divergent edge portions, wherein the lengths of said pairs of surface lengths increase outwardly relative to a reference line extending along said surface of said weigh pan in alignment with said direction of said movement.

21. A method according to claim 20, wherein each of said first and second marginal edges includes a pair of divergent edge portions, and the pairs of divergent edge portions diverge in opposite directions.

22. A method according to claim 19, wherein said surface of said weigh pan is bounded in part by first and second pairs of marginal edge portions diverging relative to a reference line extending in alignment with said direction of movement and arranged upstream and downstream of said direction of said movement, respectively, said pairs of surface lengths extend between said first and second pairs of marginal edge portions.

23. A method according to claim 22, wherein a pair of infeed conveyor elements and a pair of outfeed conveyor elements are arranged upstream and downstream of said pair of conveyor elements in said direction of said movement, and the transverse spacing between all of said pairs of conveyor elements is adjusted by like amounts.

* * * * *